(12) United States Patent
Ramstein et al.

(10) Patent No.: US 9,652,946 B2
(45) Date of Patent: *May 16, 2017

(54) HANDS-FREE, WEARABLE VIBRATION DEVICES AND METHOD

(71) Applicant: Novasentis, Inc., Burlingame, CA (US)

(72) Inventors: Christophe Ramstein, San Francisco, CA (US); Ausra Liaukeviciute, San Francisco, CA (US); Richard Ducharme, Alexandria, PA (US)

(73) Assignee: Novasentis, Inc., State College, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,813

(22) Filed: May 2, 2014

(65) Prior Publication Data

US 2015/0317885 A1   Nov. 5, 2015

(51) Int. Cl.
*H04B 3/26* (2006.01)
*G08B 6/00* (2006.01)
*H04M 1/725* (2006.01)

(52) U.S. Cl.
CPC ............. *G08B 6/00* (2013.01); *H04M 1/7253* (2013.01)

(58) Field of Classification Search
CPC ...................................................... G08B 6/00
USPC .................. 340/407.1, 539.11, 539.1, 573.1; 455/66.1
See application file for complete search history.

(56) References Cited

U.S. PATENT DOCUMENTS

| | | |
|---|---|---|
| 5,263,876 A | 11/1993 | Johnescu et al. |
| 5,350,966 A | 9/1994 | Culp |
| 5,519,278 A | 5/1996 | Kahn et al. |

(Continued)

FOREIGN PATENT DOCUMENTS

| | | |
|---|---|---|
| EP | 1544720 A1 | 6/2005 |
| JP | 2010283926 A | 12/2010 |

(Continued)

OTHER PUBLICATIONS

International Search Report and Written Opinion of the International Searching Authority for PCT/US2013/053594, date of mailing Dec. 23, 2013, 9 pages.

(Continued)

*Primary Examiner* — Brent Swarthout
(74) *Attorney, Agent, or Firm* — Hogan Lovells US LLP

(57) ABSTRACT

A wearable haptic device includes (a) substrate having provided thereon a fastener (e.g., adhesive) for attachment to a user; (b) one or more EMP transducers attached to the substrate, such that a mechanical response in each EMP transducer may provide a haptic response of sufficient magnitude to be felt by the user; and (c) control circuit controlling the vibration frequency, the time of operation and the duration for each activation of the EMP transducer. The wearable haptic device may include a wireless communication circuit (e.g., Bluetooth transceiver) for receiving message from an external device (e.g., smartphone). The control circuit interprets message received and according to the interpreted message provides an electrical stimulus to cause the mechanical response of the EMP transducer. The EMP transducer may also serve as a sensor, such that a mechanical stimulus on the EMP transducer provides an electrical response that is detected by the control circuit.

20 Claims, 2 Drawing Sheets

(56) References Cited

U.S. PATENT DOCUMENTS

| | | |
|---|---|---|
| 6,376,971 B1 | 4/2002 | Pelrine et al. |
| 6,423,412 B1 | 7/2002 | Zhang et al. |
| 6,605,246 B2 | 8/2003 | Zhang et al. |
| 6,703,257 B2 | 3/2004 | Takeuchi et al. |
| 6,787,238 B2 | 9/2004 | Zhang et al. |
| 6,809,462 B2 | 10/2004 | Pelrine et al. |
| 6,877,325 B1 | 4/2005 | Lawless |
| 6,888,291 B2 | 5/2005 | Arbogast et al. |
| 7,038,357 B2 | 5/2006 | Goldenberg et al. |
| 7,339,572 B2 | 3/2008 | Schena |
| 7,368,862 B2 | 5/2008 | Pelrine et al. |
| 7,567,681 B2 | 7/2009 | Pelrine et al. |
| 7,944,735 B2 | 5/2011 | Bertin et al. |
| 7,952,261 B2 | 5/2011 | Lipton et al. |
| 7,971,850 B2 | 7/2011 | Heim et al. |
| 8,222,799 B2 | 7/2012 | Polyakov et al. |
| 8,344,862 B1* | 1/2013 | Donham ................ 340/407.1 |
| 8,362,882 B2 | 1/2013 | Heubel et al. |
| 8,384,271 B2 | 2/2013 | Kwon et al. |
| 8,385,060 B2 | 2/2013 | Dabov et al. |
| 8,390,594 B2 | 3/2013 | Modarres et al. |
| 8,564,181 B2 | 10/2013 | Choi et al. |
| 8,970,355 B1* | 3/2015 | Stensland et al. ....... 340/407.1 |
| 9,317,116 B2* | 4/2016 | Ullrich et al. ................ 715/780 |
| 2003/0003962 A1 | 1/2003 | Vooi-Kia et al. |
| 2005/0108660 A1* | 5/2005 | Cheng et al. ................ 715/863 |
| 2005/0152325 A1* | 7/2005 | Gonzales ..................... 370/338 |
| 2007/0200467 A1 | 8/2007 | Heydt et al. |
| 2008/0284277 A1 | 11/2008 | Kwon et al. |
| 2009/0002205 A1 | 1/2009 | Klinghult et al. |
| 2009/0002328 A1 | 1/2009 | Ullrich et al. |
| 2009/0167507 A1 | 7/2009 | Maenpaa |
| 2010/0079264 A1 | 4/2010 | Hoellwarth |
| 2010/0090813 A1 | 4/2010 | Je et al. |
| 2010/0223095 A1* | 9/2010 | Ranta ................ G06Q 10/109 705/7.31 |
| 2010/0316242 A1 | 12/2010 | Cohen et al. |
| 2011/0038625 A1 | 2/2011 | Zellers et al. |
| 2011/0102160 A1* | 5/2011 | Heubel ................ G06F 3/011 340/407.1 |
| 2011/0133598 A1 | 6/2011 | Jenninger et al. |
| 2011/0290686 A1 | 12/2011 | Huang |
| 2012/0017703 A1 | 1/2012 | Ikebe et al. |
| 2012/0105333 A1 | 5/2012 | Maschmeyer et al. |
| 2012/0121944 A1 | 5/2012 | Yamamoto et al. |
| 2012/0126663 A1 | 5/2012 | Jenninger et al. |
| 2012/0126959 A1 | 5/2012 | Zarrabi et al. |
| 2012/0128960 A1 | 5/2012 | Büsgen et al. |
| 2012/0178880 A1 | 7/2012 | Zhang et al. |
| 2012/0194448 A1 | 8/2012 | Rothkopf |
| 2012/0206248 A1 | 8/2012 | Biggs |
| 2012/0223880 A1 | 9/2012 | Birnbaum et al. |
| 2013/0207793 A1 | 8/2013 | Weaber et al. |
| 2014/0035735 A1 | 2/2014 | Zellers et al. |
| 2014/0085065 A1 | 3/2014 | Biggs et al. |
| 2014/0090424 A1 | 4/2014 | Charbonneau et al. |
| 2014/0139328 A1 | 5/2014 | Zellers et al. |
| 2014/0139329 A1 | 5/2014 | Ramstein et al. |
| 2014/0139436 A1 | 5/2014 | Ramstein et al. |
| 2014/0140551 A1 | 5/2014 | Ramstein |
| 2014/0191973 A1 | 7/2014 | Zellers et al. |
| 2015/0015116 A1* | 1/2015 | Jiang .................. 310/323.01 |

FOREIGN PATENT DOCUMENTS

| | | |
|---|---|---|
| JP | 2011172339 A | 9/2011 |
| JP | 2012134998 A | 7/2012 |
| KR | 20060107259 A | 10/2006 |
| KR | 20110110212 A | 10/2011 |
| KR | 20120013273 A | 2/2012 |
| KR | 20120063318 A | 6/2012 |
| KR | 20120078529 A | 7/2012 |
| KR | 20120105785 A | 9/2012 |
| WO | 2008054959 A1 | 5/2008 |
| WO | 2010085575 A1 | 7/2010 |
| WO | 2012063166 A1 | 5/2012 |

OTHER PUBLICATIONS

International Search Report and Written Opinion of the International Searching Authority for PCT/US2013/071085, date of mailing Mar. 17, 2014, 10 pages.

International Search Report and Written Opinion of the International Searching Authority for PCT/US2013/071072, date of mailing Mar. 13, 2014, 15 pages.

International Search Report and Written Opinion of the International Searching Authority for PCT/US2013/071075, date of mailing Mar. 20, 2014, 12 pages.

International Search Report and Written Opinion of the International Searching Authority for PCT/US2013/071078, date of mailing Mar. 28, 2014, 13 pages.

International Search Report and Written Opinion of the International Searching Authority for PCT/US2013/071062, date of mailing Apr. 28, 2014, 11 pages.

International Search Report and Written Opinion of the International Searching Authority for PCT/US2014/010373, date of mailing Apr. 8, 2014, 10 pages.

Matysek et al., Combined Driving and Sensing Circuitry for Dielectric Elastomer Actuators in mobile applications, from Electroactive Polymer Actuators and Devices (EAPAD) 2011, Proc. of SPIE vol. 7976, pp. 1-11.

Neese et al., Large Electrocaloric Effect in Ferroelectric Polymers Near Room Temperature, from Science, vol. 321, Aug. 8, 2008, pp. 821-823.

Zhang et al., Giant Electrostriction and Relaxor Ferroelectric Behavior in Electron-Irradiated Poly(vinylidene fluoride-trifluoroethylene) Copolymer, from Science, vol. 280, Jun. 26, 1998, pp. 2101-2104.

Xia et al., High Electromechanical Responses in a Poly(vinylidene fluoride-trifluoroethylene-chlorofluoroethylene) Terpolymer, online link to Advanced Materials, vol. 14, Issue 21, (http://onlinelibrary.wiley.com/doi/10.1002/1521-4095(20021104)14:21<>1.0.CO;2-O/issuetoc), Nov. 2002, pp. 1574-1577.

PCT International Search Report and Written Opinion for PCT/IB2013/003212, date of mailing Oct. 15, 2014, 20 pages.

PCT International Preliminary Report on Patentability for PCT/US2013/071072, date of mailing Jun. 4, 2015, 9 pages.

PCT International Preliminary Report on Patentability for PCT/US2013/071075, date of mailing Jun. 4, 2015, 9 pages.

PCT International Preliminary Report on Patentability for PCT/US2013/071078, date of mailing Jun. 4, 2015, 10 pages.

PCT International Preliminary Report on Patentability for PCT/US2013/071085, date of mailing Jun. 4, 2015, 7 pages.

PCT International Preliminary Report on Patentability for PCT/IB2013/003212, date of mailing Jul. 16, 2015, 15 pages.

* cited by examiner

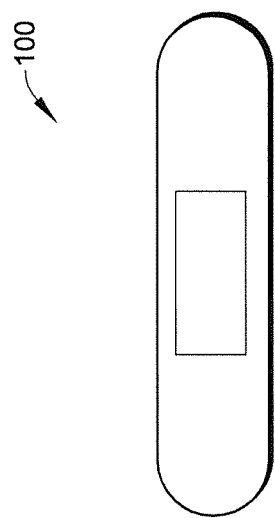
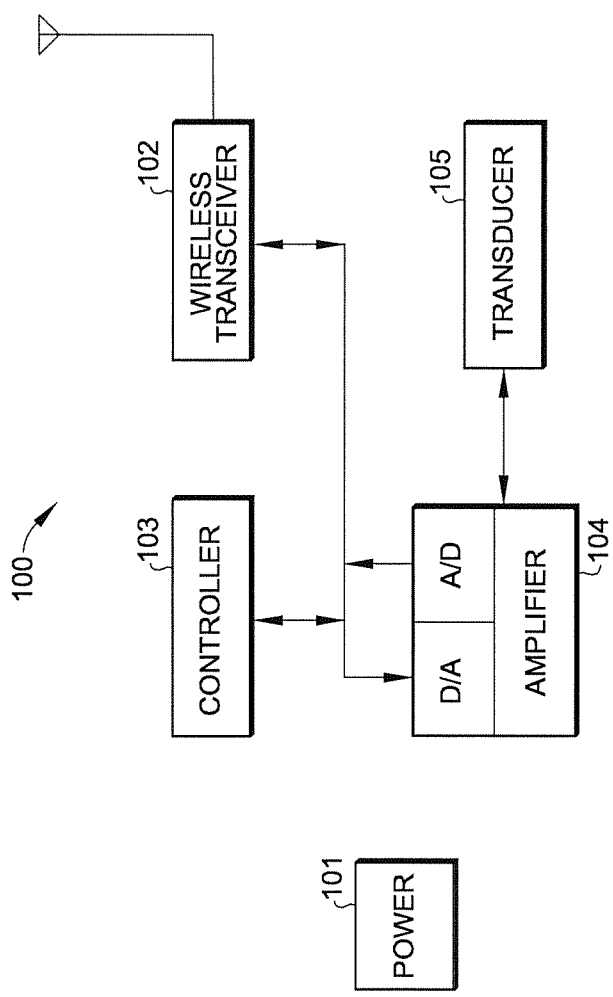
Fig. 1(b)
Fig. 1(a)

HANDS-FREE, WEARABLE VIBRATION DEVICES AND METHOD

BACKGROUND OF THE INVENTION

1. Field of the Invention

The present invention relates to wearable wireless devices. In particular, the present invention relates to wearable wireless devices using electromechanical polymer (EMP) transducers as sensors and actuators.

2. Discussion of the Related Art

Existing "wearable" devices reveal that most devices are developed for the following categories of applications: information-entertainment, fitness-wellness, and health-medical.

Users of wireless devices rely on the wireless devices for many applications, including messaging, voice calls, texting, time check, music, gaming, social media, camera, alerts, alarms, calendar, web browsing and searches. In many of these applications, the amount of information being transmitted to a user or received from a user is relatively small. Nevertheless, for the most part, sending or receiving such small amount of information still requires the user to reach for the wireless device. Therefore, efficient hands-free operations for many of these applications are highly desirable.

To address some of these needs, many types of wearable devices have been developed. For the most part, these wearable devices are quite expensive, have very limited applications, are bulky and are not attractive to wear.

SUMMARY OF THE INVENTION

According to one embodiment of the present invention, a wearable haptic device includes (a) a substrate having provided thereon a fastener (e.g., an adhesive) for attachment to a user; (b) one or more EMP transducers attached to the substrate, such that a mechanical response in each EMP transducer may provide a haptic response of sufficient magnitude to be felt by the user; and (c) a control circuit controlling the vibration frequency, the time of operation and the duration for each activation of the EMP transducer. In one embodiment, the wearable haptic device further includes a wireless communication circuit (e.g., a Bluetooth transceiver) for receiving a message from an external device (e.g., a smartphone). The control circuit interprets the message received and according to the interpreted message provides an electrical stimulus to cause the mechanical response of the EMP transducer.

According to one embodiment of the present invention, the wearable haptic device may serve as a bandage. The EMP actuators may provide vibration at different frequencies and intervals. The frequencies and intervals may be programmed during manufacturing and customized, if necessary, for the bandage in the field. Such a bandage may be particularly effective in treating ulcerated tissues or it may enhance blood flow and the exchange of oxygen.

According to one embodiment of the present invention, the EMP transducer may also serve as a sensor, such that a mechanical stimulus on the EMP transducer provides an electrical response that is detected by the control circuit. The wearable haptic device may include amplification circuitry for conditioning the electrical stimulus or response between the control circuit and the EMP transducer. The control circuit may create a message based on the detected electrical response from the EMP transducer and may send the message via the wireless communication circuit to the external device.

The present invention is better understood upon consideration of the detailed description below in conjunction with the drawings.

BRIEF DESCRIPTION OF THE DRAWINGS

FIG. 1(a) is a block diagram of haptic patch 100, in accordance with one embodiment of the present invention.

FIG. 1(b) shows an exemplary external appearance of haptic patch 100, in accordance with one embodiment of the present invention.

DETAILED DESCRIPTION OF THE PREFERRED EMBODIMENTS

Figure 2:
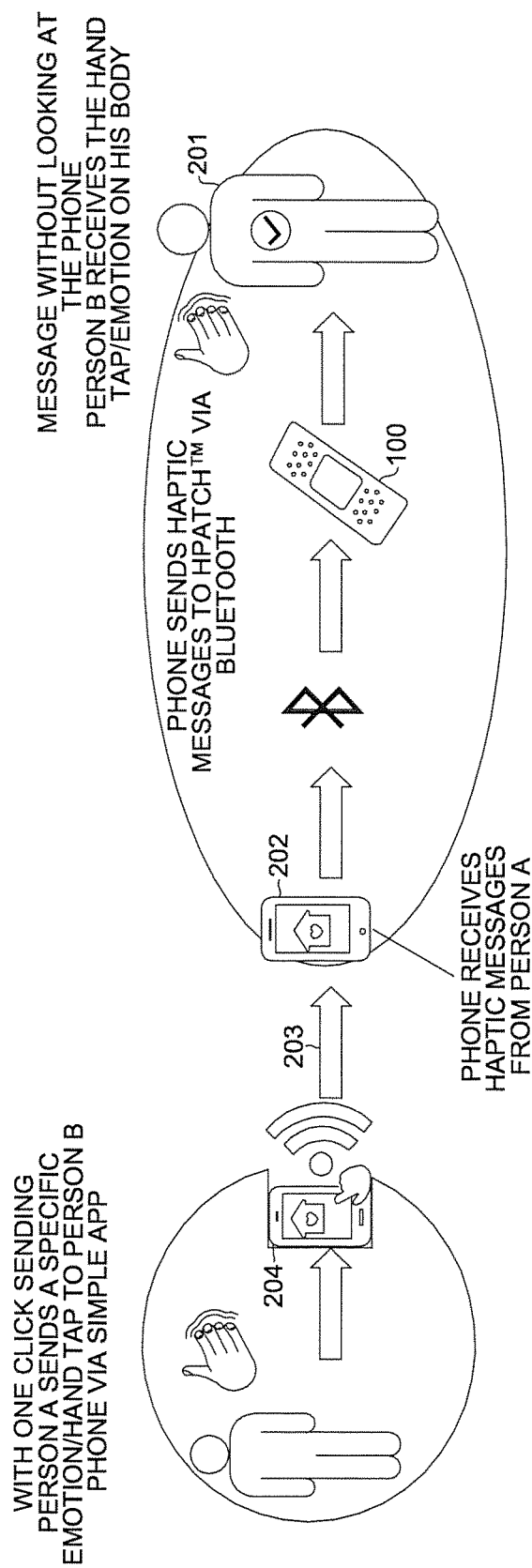
FIG. 2 shows exemplary system 200 in which haptic patch 100 may be deployed in accordance with one embodiment of the present invention.

The present invention takes advantage of the properties of thin electromechanical polymer (EMP) transducers to create wearable devices that provide, when activated, haptic response to the wearer and to provide sensing signals from the wearer to a local or remote signal processing device. EMP transducers have been disclosed, for example, in copending U.S. patent application ("Copending Application"), Ser. No. 13/683,963, entitled "Localized Multimodal Electromechanical Polymer Transducers," filed Nov. 21, 2012. The disclosure of the Copending Application is hereby incorporated by reference in its entirety.

In one embodiment, an EMP transducer may be incorporated on a small patch ("haptic patch") which may be fastened or attached by adhesive, for example, onto the skin of the wearer, his clothing or another wearable close to the wearer's body (e.g., as a pendant or provided on a pendant to be worn with a necklace). The haptic patch may be used, for example, as a wound dressing, or be attached on a wound dressing. As a wound dressing, the haptic patch is attached directly to a wound. The haptic patch may have an external protective wrapping or substrate that may be provided, for example, in a form similar to those patches used for delivering transdermal medication. As an actuator, the EMP transducer may provide a mechanical stimulus (e.g., a vibration) at the wearer's skin of suitable frequency content or strength (e.g., 25-250 Hz, or any other frequency, including ultrasound frequencies). Alternatively, the frequency content or strength of the mechanical stimulus may encode a predetermined message to the wearer. As a sensor, the wearer may cause sensing signals (e.g., by applying pressure) to be sent from the EMP transducer. In this manner, the wearer may exchange any of a large number of tangible emotions and silent messages with others. FIG. 1(a) is a block diagram of haptic patch 100, in accordance with one embodiment of the present invention. FIG. 1(b) shows an exemplary external appearance of haptic patch 100, in accordance with one embodiment of the present invention.

As shown in FIG. 1, haptic patch 100 includes power source 101 (e.g., a conventional or solar-charged battery), ultra-low power wireless communication device 102 (e.g., a Bluetooth transceiver with antenna), controller 103, amplifier 104, and EMP transducer 105. Power source 101 may supply, for example, a 0.4 watts, 150-volt voltage source for use with EMP transducer 105. Under control of controller 103, amplifier 104 may provide an electrical stimulus that activates a mechanical response in EMP transducer 105.

Alternatively, when a mechanical stimulus is impressed on EMP transducer 105, an electrical response is provided on EMP transducer 105. Amplifier 104 may amplify the electrical response to a suitable signal level to allow controller 103 to capture the electrical response. Amplifier 104 may include not only circuitry for amplification or attenuation, but also circuitry for providing and conditioning signals so as to be compatible with signal requirements of EMP transducer 105 and controller 103, such as an analog-to-digital converter and a digital-to-analog converter. As discussed above, by suitable use of frequency and mechanical or electrical signal strengths, many types of messages may be sent to or received from haptic patch 100.

FIG. 2 shows exemplary system 200 in which haptic patch 100 may be deployed, in accordance with one embodiment of the present invention. As shown in FIG. 2, wearer 201 has a haptic patch (e.g., haptic patch 100) attached to a location of his body which is sensitive to haptic responses. The existing EMP transducer technology allows such a location to be practically any location on the approximately two square meters of skin on a typical human adult. Through the on-board ultra-low power wireless communication device 102, a communication link is maintained between haptic patch 100 and wireless mobile device 202 (e.g., a smartphone), which is also connected to wireless communication network 203 (e.g., a cellular telephone network). Of course, haptic patch 100 is not limited to having just one EMP transducer; in fact, having multiple EMP transducers may allow haptic patch 100 to provide many additional effects not available to a haptic patch having a single EMP transducer.

During operation, for example, controller 103 communicates via ultra-low power wireless communication device 102 with wireless mobile device 201. Another user (e.g., a user of wireless mobile device 204) may send a message to wireless mobile device 202, which is intercepted by an application program running on wireless mobile device 202. For example, the application may recognize the message from the sender to be a request providing a gentle reminder tap to wearer (e.g., to reminder the wearer of the patch to take a scheduled dose of medication). Wireless mobile device 202 then invokes an appropriate command in controller 103 to actuate EMP transducer 105 to deliver the intended gentle tap. In the opposite direction, for example, EMP transducer 105, acting as a mechanical sensor, may provide a stream of electrical signals read periodically by controller 103. The stream of electrical signals may be interpreted by wireless mobile device 202 as, for example, measurements of blood pressure, heart rate or temperature. Wireless mobile device 202 may transmit the result, for example, to an interested party at wireless mobile device 204 (e.g., an emergency response team).

Patch 100 may be provided at minimal cost (e.g., less than $10) and operates substantially hands-free. As the cost is relatively low, patch 100 may be provided as a disposable device, desirable for reasons of hygiene. Patch 100 may also be provided by a large number of inexpensive materials, which can be colored or textured to achieve a very attractive external packaging.

In many applications, each patch may be associated uniquely with a single sender so that the sender and the wearer may agree on their private encoding of the haptic response (e.g., a gentle tap on a first patch associated with one's mother may have a different meaning than the same gentle tap on a second patch associated with one's significant other). Many encodings of suitable emotions may be expected. For example, different activations of EMP transducer 105 may encode, patting, giggle, encouragement, agitation, anger, fear, excitement, and intimacy (e.g., kiss, "you are in my thoughts right now," and arousal). Many encodings of silent messages are similarly possible. For example, different activations of EMP transducer 105 may encode a task reminder, an indication of readiness to act in concert, silent agreement or disagreement with a colleague during a negotiation session, and turn-by-turn directions. A user may select the message from an application program (or "App") running on a wireless mobile device (e.g., wireless mobile device 204), which would send instructions to the haptic patch to activate the corresponding software routines running on controller 103 to effectuate the haptic response or responses conveying the selected message. In some embodiments, the user may customize the haptic responses for a message by associating and orchestrating one or more haptic responses to that message. (Here, orchestrating refers to setting certain parameters of the haptic response, such as duration, delay, frequency, and strength).

In the case where multiple EMP transducers are provided, the EMP transducers may be activated in concert, for example, to convey directionality. Alternatively, the alternating activation of two EMP transducers creates a "blinking" sensation that may be used to represent a message appropriately expressed by such a blinking sensation. The EMP transducers may have structural differences that allow each EMP transducer to specialize in a particular modality or force regime. For example, one EMP transducer may be used to provide vibrational haptic responses, while another EMP transducer may be used to provide deformation-based haptic responses and while a third EMP transducer may provide an audio response.

Activation of a haptic response need not be controlled by wireless remote control. For example, a haptic patch may be programed to provide stretching or to provide vibration or massage for a predetermined time (e.g., two hours) on the skin to which the haptic patch is attached. The programmed operation may be initiated or stopped, for example, by a predetermined mechanical stimulus provided by the user on the patch.

The haptic patch may also be used as a programmable active bandage or dressing. It is known that ulcerated tissue may benefit from vibrations that promote oxygen exchange and that enhance blood flow. Certain vibrational frequencies and treatment intervals may be programmed for this application. The haptic patch provides a low-cost, location-specific device and does not require administration by a trained practitioner, unlike conventional ultrasound equipment, which also requires a substantial capital investment. The haptic patch also avoids the whole body vibration treatment in the prior art, which is administered by placing the patient on a vibrating platform for a prescribed time period.

The detailed description above is provided to illustrate specific embodiments of the present invention and is not intended to be limiting. Numerous modifications and variations within the scope of the present invention are possible.

The invention claimed is:
1. A wearable haptic device, comprising:
a substrate having provided thereon a fastener for attachment to a user;
a plurality of EMP transducers attached to the substrate arranged in first and second multi-row arrays, such that a mechanical response in each EMP transducer provides a haptic response of sufficient magnitude to be felt or perceived by the user;

an input device receiving a message from an external source; and a control circuit for the EMP transducers, wherein the control circuit interprets the message received and provides electrical stimuli that activate a pattern of mechanical responses in concert in the EMP transducers, the pattern being specific to the interpreted message and indicating directionality in a first mode of operation and creating a blinking sensation in a second mode of operation by alternating activation of at least two of the plurality of EMP transducers.

2. The wearable haptic device of claim 1, further comprising amplification circuitry for conditioning the electrical stimulus from the control circuit for each EMP transducer.

3. The wireless haptic device of claim 1, wherein the input device comprises a wireless communication circuit for receiving a message from an external device.

4. The wearable haptic device of claim 1, wherein the wireless communication circuit comprises a Bluetooth transceiver.

5. The wearable haptic device of claim 1, wherein the external device comprises a cellular telephone.

6. The wearable haptic device of claim 1, wherein one of the EMP transducers also serves as a sensor, such that a mechanical stimulus on that EMP transducer provides an electrical response that is detected by the control circuit.

7. The wearable haptic device of claim 6, further comprising amplification circuitry for conditioning the electrical response from the EMP transducer for the control circuit that also serves as a sensor.

8. The wearable haptic device of claim 6, wherein the input device comprises a wireless communication circuit for receiving a message from an external device, and wherein the control circuit creates a message based on the detected electrical response and sends the message via the wireless communication circuit to the external device.

9. The wearable haptic device of claim 1, wherein the fastener comprises an adhesive.

10. The wearable haptic device of claim 1, wherein the control circuit interprets the message based on a user customizable encoding scheme.

11. The wearable haptic device of claim 10, wherein the user customizable encoding scheme is established by previous agreement between a sender and a recipient of the message.

12. The wearable haptic device of claim 1, wherein the mechanical responses comprise a vibrational haptic response, a deformation-based haptic response and an audio response.

13. The wearable haptic device of claim 1, pre-programmed as a haptic patch to provide stretching or massage for a predetermined time on the skin to which the haptic device is attached.

14. The wearable haptic device of claim 13, wherein the predetermined time is two hours.

15. The wearable haptic device of claim 13, wherein the stretching or massage is initiated or stopped by a predetermined mechanical stimulus to the haptic device.

16. The wearable haptic device of claim 1, pre-programmed as an active bandage or dressing to promote oxygen exchange and enhance blood flow.

17. The wearable haptic device of claim 16, pre-programmed for a predetermined operational vibrational frequency.

18. The wearable haptic device of claim 16, pre-programmed for predetermined treatment intervals.

19. The wearable haptic device of claim 1, pre-programmed as a haptic patch comprising a private encoding of a haptic response to indicate at least one of patting, giggling, encouragement, agitation, anger, fear, excitement, or intimacy.

20. The wearable haptic device of claim 1, pre-programmed as a haptic patch comprising a private encoding of a haptic response to indicate at least one of a task reminder, an indication of readiness to act in concert, or silent agreement or disagreement with a colleague during a negotiation session, or turn-by-turn directions.

* * * * *